Patented Nov. 4, 1952

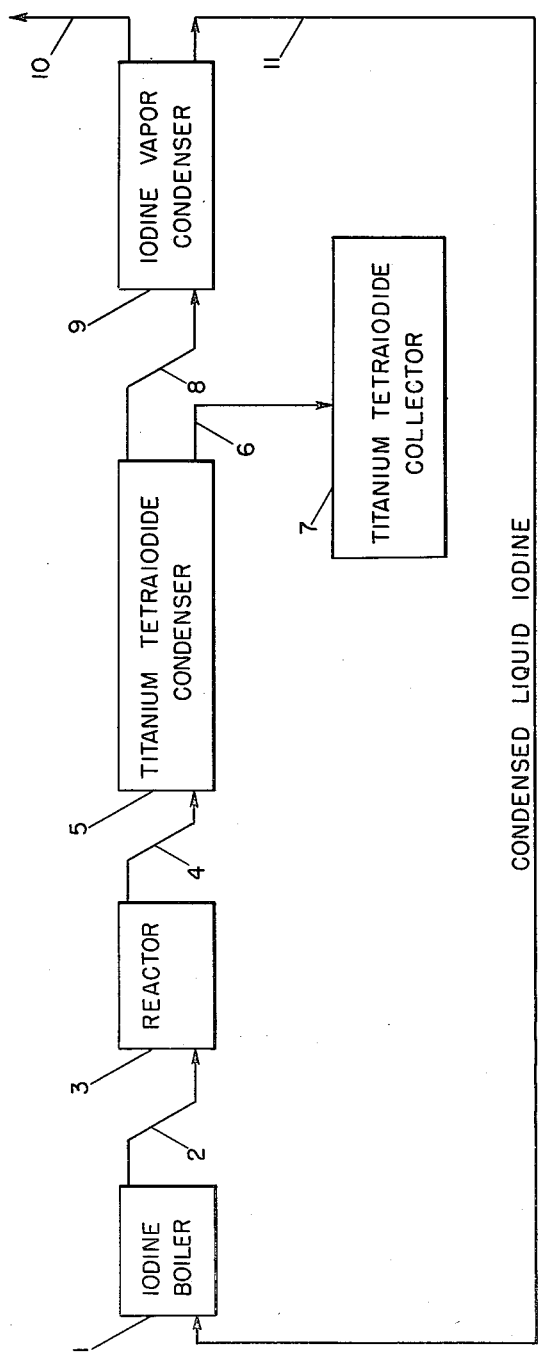

2,616,784

UNITED STATES PATENT OFFICE 2,616,784

PRODUCTION OF TITANIUM TETRAIODIDE

Lawrence J. Reimert, Palmerton, Pa., assignor to
The New Jersey Zinc Company, New York, N. Y.,
a corporation of New Jersey Application July 13, 1949, Serial No. 104,558

4 Claims. (Cl. 23—87)

This invention relates to the production of titanium tetraiodide and, more particularly, to a new method of producing said compound.

Titanium tetraiodide has recently assumed a position of considerable importance because of its use in the production of metallic titanium. Of those methods now known for producing titanium metal, the method comprising the thermal decomposition of titanium tetraiodide to metallic titanium and elemental iodine is preferred because of the high purity of the metal so obtained. The titanium tetraiodide now used in this method is produced by reacting iodine with metallic titanium of somewhat lesser purity than that ultimately obtainable from the tetraiodide. Thus, the complete process as now practiced by the art comprises first reducing titanium tetrachloride with a metal such as magnesium, calcium, or the like, by the process of the United States Patent to Kroll No. 2,205,854, in order to produce so-called "crude" titanium metal, then reacting this metal with iodine to produce titanium tetraiodide, and finally thermally decomposing the titanium tetraiodide to yield titanium metal of the desired high purity. The intermediate production of titanium metal for use as a reagent in making titanium tetraiodide has greatly complicated the task of producing high purity titanium and has contributed in large measure to its excessive cost.

It is well known that chlorine will react with titanium, under the influence of heat, to produce titanium tetrachloride. Moreover, it has been known for about a centrury that both titanium tetrachloride and titanium tetrabromide can be produced by reacting titanium dioxide, carbon and the corresponding halogen at elevated temperatures up to red heat. The carbon present in the last-mentioned reaction mixture appears to serve only to combine with the oxygen displaced by the halogen and thereby permit the halogenation reaction to proceed. At the temperatures used in carrying out such reactions between the titanium dioxide, carbon and either chlorine or bromine, the carbon is incapable of reacting with the titanium dioxide itself. Accordingly, the success of the halogenation reaction depends upon the ability of chlorine and bromine to react directly with titanium dioxide at temperatures up to those of red heat. Iodine, on the other hand, is not as reactive as chlorine and bromine in this respect, and attempts to react iodine with titanium dioxide at temperatures ranging from 500° C. up to 1150° C. have been wholly unsuccessful.

I have now discovered that although iodine will not react with titanium dioxide, it will react effectively with lower oxides of titanium, that is, with oxides of titanium wherein the titanium has a valence of less than four. The disparate properties of such lower oxides of titanium and titanium dioxide with regard to their reactivity with iodine is brought out strikingly by the fact that when iodine is reacted with any lower oxide of titanium with the resulting production of titanium tetraiodide, titanium dioxide has been formed as a non-reactive residue in the reaction zone.

Accordingly, the method of producing titanium tetraiodide in accordance with my present invention comprises passing iodine vapor in contact with an oxide of titanium in which the titanium has a valence of less than four (hereinafter referred to collectively as "lower oxides of titanium") in a reaction zone maintained at a temperature of at least 500° C. The resulting titanium tetraiodide is condensed from the effluent vapors leaving the reaction zone. Inasmuch as these lower oxides of titanium can be obtained readily by reduction of titanium dioxide, my invention contemplates a method of converting titanium dioxide to titanium tetraiodide by first subjecting the titanium dioxide to a reducing operation at a temperature within the range of about 1000° C. to about 1600° C. to produce a lower oxide of titanium, then passing iodine vapor in contact with said lower oxide in a reaction zone maintained at a temperature of at least 500° C., and subsequently condensing the resulting titanium tetraiodide from the effluent vapors leaving the reaction zone.

The lower oxides of titanium which are reacted with iodine in accordance with the present invention may be readily obtained by subjecting titanium dioxide to a reducing operation at an elevated temperature. The titanium dioxide useful for this purpose may comprise either native rutile or a titanium dioxide-bearing slag obtained as a result of the smelting of titaniferous iron ore. In both instances, however, the extraneous compounds contained along with the titanium dioxide tend to introduce contaminants into the titanium tetraiodide produced in subsequent iodization of the lower oxides of titanium. Accordingly, I prefer to use, as the titanium dioxide starting material, pigment grade anatase titanium dioxide because it is readily obtainable in a high state of purity. The somewhat higher cost of such titanium dioxide pigment is more than offset by its purity and by the enhanced value of the pure titanium tetraiodide produced therefrom. The anatase titanium dioxide is advantageously obtained from an intermediate stage in the preparation of pigment titanium dioxide prior to the addition thereto of such "end-pointing" reagents as the phosphates, silicates, aluminates, alkali sulfates and zinc oxide which are conventionally added for the purpose of controlling the color and other physical properties of the utilmate pigment. Thus, I prefer to use the titanium dioxide product obtained by hydrolysis of a titanium sulfate solution, the product being calcined to remove entrained moisture and sulfate sulfur. Although the calcined product may be used directly in the method of my invention, I have found that its reactivity is improved by ball-milling the calcined mass with the resulting production of $TiO_2$ particles having an average size within the range of 0.2 to 0.5 micron.

The titanium dioxide starting material may be converted readily to one or more lower oxides of titanium by reduction with either hydrogen, carbon monoxide or carbon at an elevated temperature. Although other reducing agents may be used, hydrogen, carbon monoxide and carbon are preferred inasmuch as they do not introduce any foreign contaminant into the lower oxides of titanium so formed which will be carried over into the titanium tetraiodide produced therefrom. The specific lower oxide of titanium predominating in the product of the reducing operation depends primarily upon the temperature at which the reduction is effected. For example, when using a reduction temperature within the range of about 1000°–1100° C., the reduced titanium oxide product appears to consist, according to chemical analysis, of a compound corresponding to the formula $Ti_4O_7$. At reducing temperatures within the range of about 1300°–1400° C., the reduced titanium oxide product appears to correspond to the formula $Ti_2O_3$. Reduction temperatures of 1500° C. and higher lead to the production of $TiO$. Reduction temperatures intermediate the aforementioned ranges result in products having compositions intermediate those referred to hereinbefore, increasing temperatures from about 1000° C. tending to produce titanium oxides of progressively lower oxygen content.

Although the lower titanium oxides produced as described hereinbefore can be subjected directly to contact with the iodine vapor with the resulting production of titanium tetraiodide, I have found that the rate of production of the tetraiodide is increased by increasing the degree of subdivision of the lower oxide of titanium. In general, I have found that wholly satisfactory results are obtained by grinding the lower oxide in a ball mill and charging the resulting product directly to the iodization reaction zone. When the lower oxide of titanium is not so finely divided as to pack down in the reaction zone, suitable results have been obtained by passing iodine vapor in contact with the loose charge. However, where the lower oxide has been ground to a fine condition to increase the iodization reaction rate, it is advantageous to form the oxide into agglomerates prior to charging to the reaction zone. Agglomeration may be effected readily, for example, with either pitch, sulfite liquor or bentonite, or mixtures thereof. The use of either pitch or sulfite liquor is preferred, however, because both materials will decompose at calcination temperatures leaving a residue consisting only of carbon. Bentonite has the disadvantage of introducing foreign residues into the titanium oxide reactant whence they may be carried over into the titanium tetraiodide product.

Either crude or pure iodine may be used in the practice of the invention. Crude iodine leaves a cake of residue in the vessel wherein the iodine is boiled to produce the vapors which are passed through the lower oxide of titanium but otherwise is suitable for the practice of my invention. Accordingly, I prefer to use re-sublimed U. S. P. iodine because it does not introduce any impurities into the process or the product.

The amount of iodine used in practicing the invention is not critical, the only requirement being that iodine vapor be available for contact with the lower oxide of titanium in order to produce the desired titanium tetraiodide. When the method is practiced in apparatus wherein unreacted iodine vapor leaving the reaction zone is recirculated therethrough, the amount of iodine present in the apparatus should be sufficient to maintain the necessary partial pressure of iodine vapor in the reaction zone to promote the iodization reaction. The iodization of the lower oxide of titanium in accordance with my invention requires a reaction temperature of at least 500° C. At a temperature of about 550° C. the reaction proceeds readily and at a satisfactory rate. Increasing reaction temperatures within the range of 500°–600° C. tend to promote increasing iodization reaction rates but little, if any increase in the reaction rate has been observed at temperatures in excess of about 600° C. Temperatures as high as 1000° C. have been found to produce titanium tetraiodide in accordance with the invention, although there appears to be no justification for using such elevated temperatures.

The product of the iodization reaction in accordance with my invention comprises vapors of titanium tetraiodide and an ultimate reaction residue composed of titanium dioxide. Titanium dioxide appears to be the common residue regardless of the state of oxidation of the lower oxide of titanium used as the starting material. The amount of the lower oxide which is converted to titanium tetraiodide varies in indirect proportion to the percentage of the lower oxide which is converted to the non-reactive titanium dioxide residue. This residue ranges in amount from 92% of the starting material in the case of lower oxides corresponding to the formula $Ti_4O_7$ to 62.5% of the starting material when the latter comprises $TiO$. The titanium dioxide residue may be recovered by subjecting it to the aforementioned reducing operation for the purpose of converting it to one or more of the lower oxides of titanium.

The titanium tetraiodide is obtained from the hot effluent gases leaving the reaction zone by cooling these vapors to a temperature below the dew point of titanium tetraiodide and preferably to a temperature between the boiling point and dew point of iodide. When the titanium tetraiodide is condensed at a temperature approximating the boiling point (183° C.) of the unreacted iodine contained in the effluent gases, as much as 30% by weight of free iodine will dissolve in the tetraiodide, the actual amount of dissolved iodine at any condensation temperature depending upon the partial pressure of the iodine in the condensing zone. However, by drawing off the condensed titanium tetraiodide and refluxing it in a separate collection vessel by heating it to a temperature of at least about 300° C., the amount of free iodine dissolved in the titanium tetraiodide is reduced to about 1 to 2%. Accordingly, it is my preferred practice to effect the condensation of titanium tetraiodide from the reaction zone effluent at a temperature close to but below the boiling point of iodine and then to draw off the condensed titanium tetraiodide into a reservoir wherein the titanium tetraiodide is collected and maintained at a temperature within the range of about 350°–375° C.

The unreacted iodine vapor from which the titanium tetraiodide is separated may be recovered in any suitable manner. I have found it particularly advantageous to cool the effluent vapors from which the titanium tetraiodide has been separated to a temperature below the boiling point of iodine but above its melting point. Under these conditions, the unreacted iodine may be collected as a liquid and can be returned readily to the main body of iodine from which the iodine vapors for the reaction are evolved.

The practice of the method of my invention may be illustrated by reference to the accompanying schematic drawing. Iodine is boiled in an iodine boiler 1 in order to evolve iodine vapors which pass through line 2 to a reactor 3. The reactor is charged with agglomerates of ball-milled lower oxides of titanium prepared by wetting the oxides with water, then adding about 10% by weight of pitch as a binder, extruding the mixture, and finally calcining the extruded pieces to coke the pitch. The lower titanium oxides are advantageously produced by heating titanium dioxide anatase pigment free of "end-pointing" reagents to a temperature of about 1350° C. in an atmosphere of hydrogen with the resulting formation of a product composed predominantly of $Ti_2O_3$. The iodine vapors from the boiler are passed through the agglomerates in the reactor, and the resulting gaseous effluent from the reactor flows through line 4 into a titanium tetraiodide condenser 5 maintained at a temperature of about 150°–180° C. The condensed titanium tetraiodide is withdrawn through line 6 to a titanium tetraiodide collector 7 which is preferably maintained at a refluxing temperature between about 350° and 375° C. The uncondensed gaseous effluent leaving the titanium tetraiodide condenser 5 passes through line 8 into an iodine vapor condenser 9 which is held at a temperature slightly above the melting point of iodine. Any uncondensed vapors present in the gaseous effluent from the reactor are vented through a discharge line 10, and the condensed liquid iodine is returned through line 11 through the iodine boiler 1. The various elements of the apparatus may be constructed of any suitable corrosion-resistant alloy such as stainless steel, nickel, Monel metal, or the like, inasmuch as the temperatures prevailing in these elements do not subject the elements to unduly corrosive conditions.

The titanium tetraiodide produced in accordance with the invention is characterized by its high purity, particularly when it is produced from reagents relatively free from extraneous components. Thus, titanium tetraiodide produced pursuant to my above-described method by the reaction between re-sublimed U. S. P. iodine vapor and agglomerates composed of lower oxides of titanium obtained by high temperature reduction of titanium dioxide anatase pigment free of end-pointing reagents is substantially free of all impurities. The product contains, by chemical analysis, a ratio of titanium-to-iodide iodine which is substantially that theoretically called for by the formula $TiI_4$. The only significant contaminant in the titanium tetraiodide comprises dissolved iodine which may, as indicated hereinbefore, be limited to a maximum of about 1%. By further rectification of the titanium tetraiodide product, still lower contents of free iodine may be obtained. The titanium tetraiodide produced in accordance with the invention has been used satisfactorily in the production of metallic titanium of exceptionally high purity by thermal decomposition of the tetraiodide at a temperature of about 1250° C. under a subatmospheric pressure of about 25 microns of mercury.

A method of producing titanium tetraiodide by passing iodine vapor through a reaction zone charged with a mixture of titanium dioxide and carbon and maintained at a temperature of at least 1000° C. is described and claimed in my co-pending United States patent application Serial No. 104,557, filed July 13, 1949.

I claim:

1. The method of converting titanium dioxide to titanium tetraiodide which comprises subjecting titanium dioxide to a reducing operation with a reducing agent of the group consisting of hydrogen and carbon at a temperature within the range of about 1000° C. to about 1600° C. to produce a lower oxide of titanium consisting substantially of an oxide of titanium in which the titanium has a valence of less than four and free of metallic titanium, heating a body of iodine to its boiling point, passing the resulting evolved iodine vapor in contact with said reduced oxide in a reaction zone maintained at a temperature of at least 500° C., condensing the resulting titanium tetraiodide from the effluent vapors leaving the reaction zone at a temperature between the boiling point and dew point of unreacted iodine in said effluent, separating the condensed titanium tetraiodide from unreacted iodine vapor contained in said effluent vapors, condensing said unreacted iodine vapor to effect recovery thereof, and returning the condensed iodine to said body thereof.

2. The method of producing titanium tetraiodide which comprises charging a reaction zone with a metallic titanium-free oxide of titanium consisting substantially of an oxide of titanium in which the titanium has a valence of less than 4, maintaining the reaction zone at a temperature of at least 500° C., passing iodine vapor through the reaction zone in contact with said titanium oxide, and condensing the resulting titanium tetraiodide from the effluent vapors leaving the reaction zone.

3. The method of producing titanium tetraiodide which comprises charging a reaction zone with a metallic titanium-free oxide of titanium consisting substantially of an oxide of titanium in which the titanium has a valence of less than 4, maintaining the reaction zone at a temperature of at least 500° C., passing iodine vapor through the reaction zone in contact with said titanium oxide, condensing the resulting titanium tetraiodide from the effluent vapors leaving the reaction zone, separating the condensed titanium tetraiodide from unreacted iodine vapor contained in said effluent vapors, condensing said unreacted iodine vapor to effect recovery thereof, and returning the condensed iodine to said body thereof.

4. The method of producing titanium tetraiodide which comprises charging a reaction zone with a metallic titanium-free oxide of titanium consisting substantially of an oxide of titanium in which the titanium has a valence of less than 4, maintaining the reaction zone at a temperature of at least 500° C., passing iodine vapor through the reaction zone in contact with said titanium oxide, condensing the resulting titanium tetraiodide from the effluent vapors leaving the reaction zone at a temperature of about 150°–180° C., separating the condensed titanium tetraiodide from unreacted iodine contained in said effluent vapors, subjecting the separated titanium tetraiodide to refluxing at a temperature of about 350°–375° C. to remove dissolved iodine therefrom, and condensing the unreacted iodine vapor in said effluent and the iodine vapor removed from the separated titanium tetraiodide to effect recovery thereof.

LAWRENCE J. REIMERT.

REFERENCES CITED

The following references are of record in the file of this patent:

UNITED STATES PATENTS

| Number | Name | Date |
|---|---|---|
| 1,179,394 | Barton | Apr. 18, 1916 |
| 1,389,191 | Goldschmidt | Aug. 30, 1921 |
| 2,245,076 | Muskat et al. | June 10, 1941 |
| 2,378,675 | Agnew et al. | June 19, 1945 |
| 2,401,543 | Brallier | June 4, 1946 |

OTHER REFERENCES

Mellor: "Inorganic and Theoretical Chemistry," vol. 2, page 66; vol. 7, pages 27, 28, 43, 89. Longmans, Green & Co., N. Y.

Mellor: "Modern Inorganic Chemistry," single vol., January 1935 edition revised, page 982. Longmans, Green & Co., N. Y.

"Handbook of Chemistry and Physics," 27th ed., page 1703. Editor, C. D. Hodgman. Chemical Rubber Publishing Co., Cleveland, Ohio.

"A Treatise on Chemistry," by Roscoe and Schorlemmer, vol. 2, 1907 ed., pp. 797, 799. MacMillan and Co., Ltd., London.

McPherson and Henderson's "General Chemistry," 3rd ed., pp. 412, 413, 457. Ginn & Co., N. Y.

Russian Journal, No. 56, 1926 ed., page 87.

"Titanium," by Barksdale, 1949 ed., pp. 59–62. Ronald Press Co., New York.

"Inorganic Chemistry," by Ephraim, 4th ed. revised (1943), page 323, Nordeman Publishing Co., Inc., N. Y.